(12) United States Patent
Modi

(10) Patent No.: US 6,461,683 B1
(45) Date of Patent: Oct. 8, 2002

(54) METHOD FOR INORGANIC PAINT TO PROTECT METALLIC SURFACES EXPOSED TO MOISTURE, SALT AND EXTREME TEMPERATURES AGAINST CORROSION

(75) Inventor: Paresh R. Modi, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/679,591

(22) Filed: Oct. 4, 2000

(51) Int. Cl.[7] .............................. B05D 1/36; B05D 7/00
(52) U.S. Cl. ................... 427/410; 427/397.7; 427/402; 427/407.1
(58) Field of Search ................ 427/212, 402, 427/397.7, 421, 410, 428, 435, 429

(56) References Cited

U.S. PATENT DOCUMENTS

| | | | |
|---|---|---|---|
| 2,023,496 A | 12/1935 | Todd ............................... 87/5 |
| 3,615,895 A | 10/1971 | Freyhold et al. ........ 148/6.15 R |
| 3,787,226 A | 1/1974 | Iglehart et al. ............... 117/66 |
| 4,146,410 A | 3/1979 | Reinhold .................... 148/6.2 |
| 4,238,350 A | 12/1980 | Larsen et al. ................ 252/392 |
| 4,380,268 A | 4/1983 | Martin ........................ 166/304 |
| 4,426,309 A | 1/1984 | Abel et al. .................... 252/75 |
| 4,439,416 A | 3/1984 | Cordon et al. ................ 424/47 |
| 4,846,989 A | 7/1989 | Killa ........................... 252/99 |
| 5,232,514 A | 8/1993 | Van Sciver et al. ........... 134/26 |
| 5,342,578 A | 8/1994 | Agrawal et al. .............. 422/13 |
| 5,375,378 A | 12/1994 | Rooney ........................ 451/38 |
| 5,389,405 A | 2/1995 | Purnell et al. .............. 427/387 |
| 5,399,210 A | 3/1995 | Miller ........................ 148/273 |
| 5,427,709 A | 6/1995 | Antin et al. ................ 252/135 |
| 5,451,431 A | 9/1995 | Purnell et al. ............... 427/387 |
| 5,700,523 A | 12/1997 | Petrole et al. ........... 422/397.8 |
| 5,702,768 A | 12/1997 | Orr ............................ 427/421 |
| 5,901,071 A | 5/1999 | Sakai et al. ................. 364/578 |
| 5,938,861 A | 8/1999 | Inoue et al. ................. 148/247 |
| 5,964,928 A | 10/1999 | Tomlinson ............... 106/14.21 |
| 6,022,425 A | 2/2000 | Nelson et al. .............. 148/272 |
| 6,027,580 A | 2/2000 | McCormick ................ 148/265 |

FOREIGN PATENT DOCUMENTS

| | | |
|---|---|---|
| GB | 127772 | 6/1919 |
| JP | 51-136539 | 11/1976 |
| JP | 56-27894 | 3/1981 |
| JP | 58-126989 | 7/1983 |
| JP | 59-20476 | 2/1984 |
| JP | 61-295379 | 12/1986 |
| JP | 63-159477 | 7/1988 |
| JP | 1-289873 | 11/1989 |
| JP | 2-125884 | 5/1990 |

*Primary Examiner*—Michael Barr
*Assistant Examiner*—Rebecca A. Blanton
(74) *Attorney, Agent, or Firm*—Marsh Fischmann & Breyfogle LLP

(57) ABSTRACT

A method for inhibiting corrosion of aluminum and other metal-containing surfaces exposed to environmental conditions, including moisture, salt and extreme temperatures, for extended periods. In one embodiment, an aqueous silicate solution is applied to a water break free aluminum alloy surface, forming a silicate protective film on the surface. After the silicate compound protective film dries, an aqueous dichromate solution is applied to the surface, forming a dichromate sealant layer on top of the silicate protective film. The combination of silicate compound protective film and dichromate compound sealant layer provides significant corrosion-inhibiting effects, protecting the underlying metal surface from corrosion for periods more than a year even when the metal surface is exposed to rain, salt fog, and extremes of temperature.

22 Claims, 4 Drawing Sheets

METHOD FOR INORGANIC PAINT TO PROTECT METALLIC SURFACES EXPOSED TO MOISTURE, SALT AND EXTREME TEMPERATURES AGAINST CORROSION

FIELD OF THE INVENTION

The present invention relates generally to methods for protecting metallic surfaces from corrosion and, more specifically, to a method for protecting the internal and/or external metallic surfaces, such as aluminum alloy propellant tanks or other components, from corrosion due to exposure to environmental moisture, salt and warm and extreme cold with a coating, which is referred to herein as an inorganic paint for metal corrosion protection (IMCP).

BACKGROUND OF THE INVENTION

Various metallic surfaces exposed to environmental conditions are prone to corrosion. The internal and external surfaces of propellant tanks and other space hardware are generally constructed of lightweight aluminum alloys, which are especially prone to corrosion. Such alloys may include the 2014-T6 aluminum alloy which is susceptible to corrosion. Propellant tanks and associated hardware, which are typically launched from coastal locales or even from ships, may be exposed to humidity and extreme temperatures, as well as to salt fog and sunlight during transportation and while on the launch pad, awaiting use. Such conditions may accelerate corrosion of aluminum alloys and other metals used in the propellant tanks and associated hardware. Corrosion of internal and external surfaces may cause pitting, cracking and other degradation that substantially affect the integrity of the surfaces. Most conventional anti-corrosive paints, such as organic-based paints, cannot be used on propellant tank surfaces because such paints are incompatible with certain fuels, such as liquid oxygen, and could create a risk of fire or explosion. Chromate conversion spray coatings, while compatible with liquid oxygen, require treatment with large quantities of coating material over a longer period of time within an enclosed area. The present invention provides an improved method for protecting metal surfaces from corrosion, involving treatment of metal surfaces using inorganic materials like a paint application, in a chemically controlled space, to form thin anti-corrosion protective layers that are compatible with liquid oxygen.

SUMMARY OF THE INVENTION

An object of the present invention is to provide a method for protecting the aluminum alloy and other metal surfaces of space launch vehicles/spacecrafts and other metal structures from corrosion that may occur when such surfaces are exposed to environmental conditions such as moisture, salt, and/or warm/extreme cold.

A further object of the invention is to provide a method for protecting aluminum alloy and other metal surfaces from corrosion by treatment with a corrosion-inhibiting substance that is compatible with a space vehicle fuel, such as liquid oxygen or liquid hydrogen or other fuels.

The present invention relates to a method for inhibiting corrosion of metal-containing surfaces, such as aluminum-alloy surfaces, that may occur when such surfaces are exposed to adverse environmental conditions. More specifically, the invention is directed to a method for inhibiting corrosion on such surfaces which involves generally the application of an inorganic aqueous alkali silicate corrosion-inhibiting solution followed by application of an aqueous inorganic sealant solution.

In one aspect of the invention, the method may involve contacting a first amount of aqueous silicate solution with a section of a metal surface to form a protective film. In a preferred embodiment, the aqueous silicate solution comprises sodium silicate. The metal surface may be comprised of aluminum alloy, or another similar least-resistant-to-corrosion metal (e.g., alloy/carbon steel, magnesium alloy, etc.). The method further involves the step of permitting the aqueous silicate solution to dry. Following drying, the method involves the step of applying a first amount of sealant solution to the portion of the metal surface contacted with the silicate solution. A portion of the sealant solution adheres to the silicate protective film and fills micro porosities that may exist in the protective film, forming a sealant layer. Such micro porosities have previously allowed small areas of the metal surface to be exposed to the atmosphere, thus permitting corrosion, especially when the metal surface is exposed to environmental conditions for extended periods. The sealant layer of the present invention coats the metal at the bottom of the porosities and/or plugs or caps the porosities to protect the metal at the bottom from exposure to the atmosphere. After the step of applying, the method includes the step of permitting the sealant layer to dry. In a preferred embodiment, the sealant solution comprises aqueous sodium dichromate solution, and the sealant layer comprises a dichromate compound, and the resultant coating is referred to as IMPC.

In another aspect of the invention, the method also includes the step, before the step of contacting an amount of aqueous silicate solution with a section of the metal surface, of cleaning the section of the metal surface to be contacted with aqueous silicate solution to remove any impurity on the metal surface. In a preferred implementation of this step of the invention, the cleaning step produces or results in a water break free surface. The method may also include the step of evaluating the metal surface to determine whether it is a water break free surface. If the metal surface is not a water break free surface, then the method includes applying a cleaner with the objective of providing a water break free surface.

In a further aspect of the invention, the method also includes the step, after the step of applying a first amount of sealant solution, and before the sealant solution dries, of rinsing the metal surface with an amount of water, preferably deionized water, with the objective of removing a portion of sealant solution that may not have adhered to the protective silicate film, and sealed porosities within the protective film. In another implementation, the method may include a step of lightly wiping the metal surface using a water dampened clean cloth to remove sealant solution that may not have adhered to the protective silicate film and sealed porosities. Deionized water is preferred.

The present invention is adaptable to various metal surfaces that may be subject to corrosion, including internal and external metal surfaces of space launch vehicles and spacecraft, as well as tanks, pipes, bins, and silos or other hardware. The aqueous silicate solution may be formed from any of several alkali metal silicates, although in the present invention, sodium silicate is the preferred source of silicate. The aqueous silicate and sealant solutions may be applied to the metal surfaces in various ways, such as by spraying, brush- or roller-painting, or immersing. A preferred embodiment of the present invention involves spraying a metal surface with the relevant solution in successive perpendicular passes.

The silicate protective film and preferred dichromate sealant layer are compatible with liquid oxygen, and so may be used with metal surfaces that may come in contact with liquid oxygen. In addition, they preferably may be applied with a simple pressure sprayer, in relatively low concentrations, over a short period of time, in the chemically controlled space.

BRIEF DESCRIPTION OF THE DRAWINGS

For a more complete understanding of the present invention, and the further advantages thereof, reference is now made to the following detailed description taken in conjunction with the drawings, in which.

DETAILED DESCRIPTION

Figure 1:
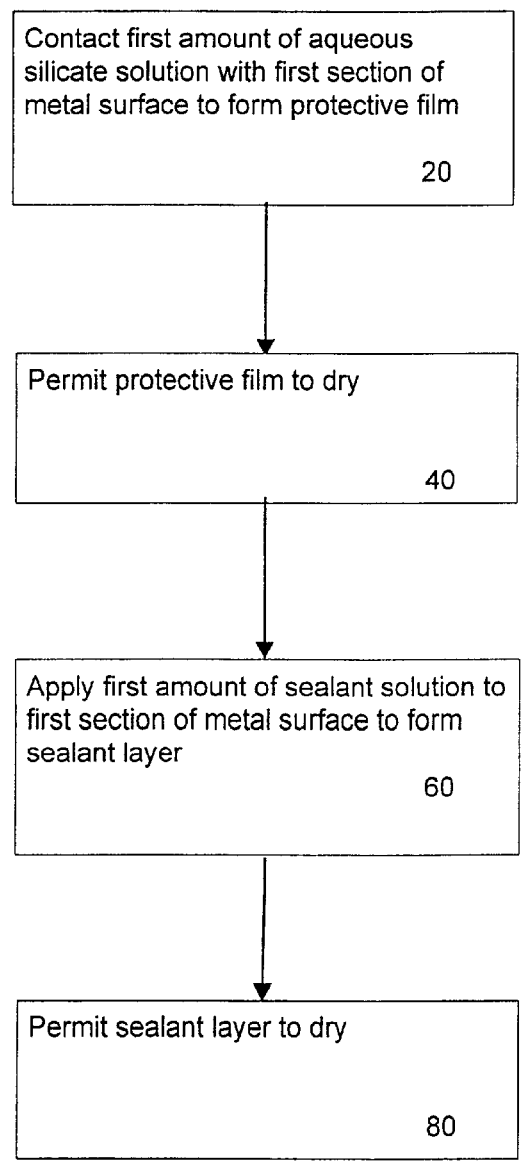
FIG. 1 is a flow chart of one embodiment of the method of the present invention.

In the following description, the invention is set forth in the context of treating the internal and/or external metal surfaces of space vehicles or other space components, including the oxidizer and fuel propellant tanks, to inhibit corrosion of such surfaces.

Following fabrication, space vehicles are transported to launch sites, which are generally located near or on an ocean. After arrival, the vehicles may be exposed to a variety of environmental conditions, including rain, humidity, salt, and heat and cold while awaiting use. Corrosion of the space vehicle and other associated hardware surfaces may cause pitting, cracking and other degradation that may affect the integrity of such surfaces, increasing the risk of structural failure when the surfaces experience stress during use. The metal surfaces of space vehicles are typically comprised of lightweight aluminum alloys, selected from the 2,000, 6,000, and 7,000 series. Such alloys are susceptible to corrosion, especially the 2014-T6 aluminum alloy, which is composed of a relatively high level of copper.

The application of an aqueous silicate solution to aluminum alloy surfaces in the manner of a paint creates a protective film that inhibits corrosion. The silicate protective film may have porosities, often microscopic in size, that allow oxygen, moisture and salt of the ambient atmosphere to have access to the underlying aluminum alloy surface. Under certain conditions, such as where such aluminum alloy surfaces coated with a silicate protective film are exposed to adverse environmental conditions for extended periods of time, such surfaces may suffer corrosion. The present invention recognizes that micro porosities in the silicate film may be a factor in cases where corrosion occurs after extended exposure of silicate-treated aluminum surfaces to environmental conditions. The invention accordingly attempts to reduce such corrosion, in part, by application of a layer of sealant, on top of the silicate protective film, with the goal of completely filling and sealing a substantial quantity of micro porosities, to produce enhanced corrosion-inhibiting effects.

The present invention envisions that any of various sealants may be used, although sealants having a paint-like effect are preferred. In the present invention, sodium dichromate produces preferred corrosion-inhibiting effects, and offers other advantages in relative ease of application like a paint, and compatibility with liquid oxygen.

The present invention also recognizes the concentration of the silicate solution as a factor in the effectiveness of the silicate protective film. Lower concentrations of sodium silicate in solution, below about 24% by volume of prime sodium silicate solution, form a very thin protective film with reduced corrosion-inhibiting affects. High concentrations of sodium silicate in solution, above about 31% by volume of prime sodium silicate solution, result in a thicker protective film, with substantial porosities, and with reduced corrosion-inhibiting effects. As discussed in greater detail below, a preferred concentration of silicate in aqueous solution, in the range 25–30% by volume of prime sodium silicate solution, provides enhanced corrosion-inhibiting effects.

FIG. 1 is a flow chart of one embodiment of the method for inhibiting corrosion of the present invention. In this embodiment, the method includes a step 20 of contacting a first amount of an aqueous silicate solution with a first section of a metal surface to form a protective film on the first section. In a preferred embodiment, the aqueous silicate solution is formed from sodium silicate, although any one of several alkali metal silicates, such as potassium silicate, may be used in other embodiments depending on environmental rules of the location. The resulting protective film includes silicate compound. The step 20 of contacting may comprise one of the steps of spraying, rolling, or brushing the silicate solution on the metal surface like a paint, or it may include other techniques such as washing or immersing the metal surface in the silicate solution like a paint (IMPC). The method of the present invention further includes a step 40 of permitting the protective film to dry. The step 40 of drying may comprise active drying techniques, such as lightly blowing with a fan air or a gas like nitrogen, or may include passive techniques such as simply allowing the protective film to dry by exposure to the ambient atmosphere. The step 40 of drying preferably includes allowing the silicate solution to dry so that protective film and any micro porosities formed are permitted to harden. The process further comprises the step 60, following the step 40 of drying, of applying a first amount of sealant solution to the first section of the metal surface to form a sealant layer over the silicate protective film. In a preferred embodiment, the sealant solution is an aqueous dichromate solution comprised of sodium dichromate. Other forms of inorganic dichromate compounds may be utilized in the method. In a preferred embodiment, the sealant solution is applied like a paint. Preferably, the step of applying includes allowing a portion of the sealant solution to completely fill and seal porosities in the silicate protective film, forming a sealant layer. The micro porosities may include openings to the base metal surface through the silicate protective film by which air, moisture, and salt may come in contact with the underlying first section of the metal surface. These porosities are microscopic pores permitting atmospheric contact with the metal surface. The method also comprises a step 80 of permitting the sealant layer to dry. This step 80 also may be accomplished by any of the active or passive drying techniques described above. In a preferred embodiment, the resulting sealant layer is comprised of dichromate compounds.

Figure 2:
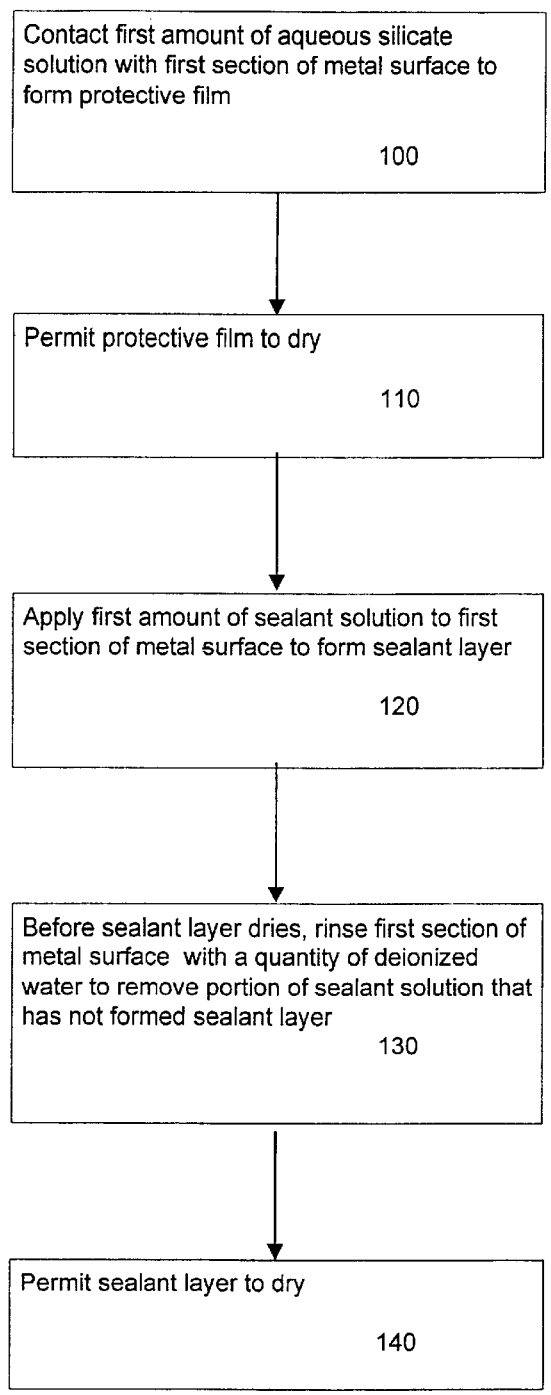
FIG. 2 is a flow chart of another embodiment of the method of the present invention.

FIG. 2 is a flow chart showing another embodiment of the method of the present invention. This embodiment includes a step 100 of contacting a first amount of aqueous silicate solution with a first section of a metal surface to form a protective film, and a step 110 of permitting the protective film to dry. The method further comprises a step 120 of applying a first amount of a sealant solution to a first section of the metal surface to form a sealant layer. A preferred sealant solution is an aqueous sodium dichromate solution. In this embodiment, the process also includes a step 130 that involves, before the sealant layer dries, rinsing the first section of the metal surface with deionized water to remove a portion of the sealant solution that has not contributed to the sealant layer. In this step, the process seeks to remove any excess solution that has not adhered to and sealed the protective film, before said excess solution dries and forms a heavy deposit on the protective film. The method envisions that the step 120 of applying results in the solution forming a thin sealant layer on the silicate protective film, and lining, capping and/or plugging any micro porosities in the protective film. Rinsing with deionized water leaves this sealant layer intact while washing away any sealant solution that was unnecessary to form a sealant layer on the protective film. Another embodiment of the method involves removing excess sealant by wiping the metal surface with a clean cloth dampened with water to remove excess sealant Deionized water is preferred. An advantage of rinsing or wiping off excess sealant solution is that this reduces the weight of sealant layer, which may be a benefit in various applications, such as in the aerospace field. Removal of excess sealant solution is cosmetic and results in a more attractive appearance of the coating. Removal of excess sealant solution, however, does not necessarily reduce or improve corrosion-inhibiting effects of the sealant layer, combined with the underlying silicate protective film. As shown in FIG. 2, the present embodiment of the invention includes also a step 140 of permitting the sealant layer to dry. In this embodiment, a preferred sealant solution is aqueous dichromate solution, and the preferred sealant layer produced is comprised of dichromate compound, although other sealants comprised of dichromate compounds may be used.

Figure 3:
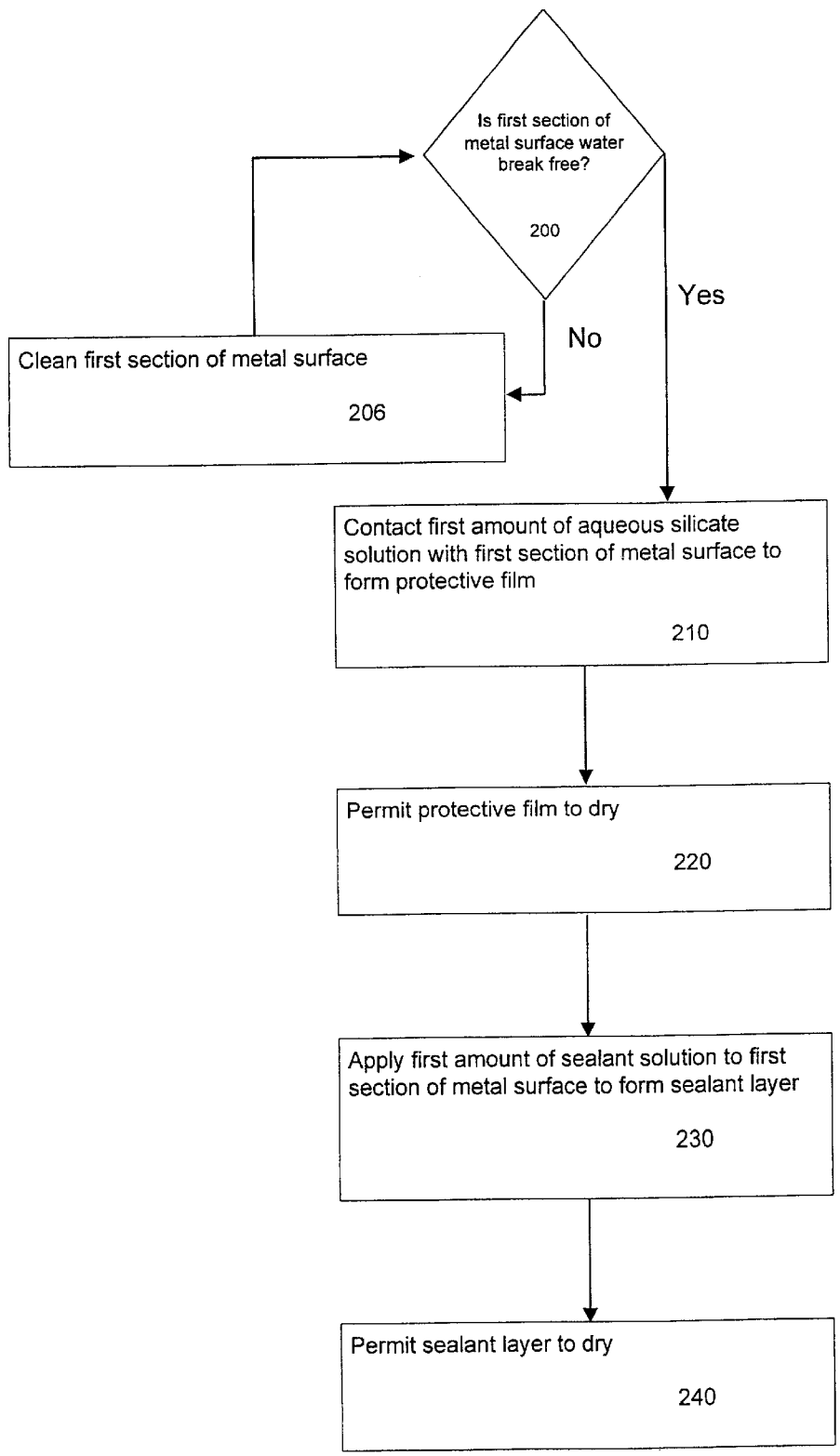
FIG. 3 is a flow chart of a further embodiment of the method of the present invention.

FIG. 3 is a flow chart depicting another embodiment of the present invention, which enhances further the corrosion-inhibiting effects of the present method. This embodiment includes a preliminary step 200 of evaluating a first section of a metal surface to determine whether the surface is a water break free surface. This step generally involves a method well known to those in the field of visual observation of the flow of deionized water over the metal surface. If no impurities such as oil/grease are present, the water sheets off the surface smoothly and evenly without "breaks." If an impurity is present, water flowing over the surface will display a characteristic "break" where the impurity is present. If the individual carrying out the process performs step 200 of evaluating said first section of the metal surface and concludes it is not water break free, then the process continues with step 206 of cleaning the first section of the metal surface. Such cleaning may be directed to part of the surface, where the impurity is believed to be located, or may involve the entire surface. Such cleaning may be accomplished by any method known to those in the field appropriate to remove impurities from an aluminum alloy surface, and typically involves rinsing with deionized water after removing impurities with any cleaning agent, to an acceptable level. The cleaning agent should be compatible with liquid oxygen or other fuels. Following step 206, the process then involves repeating step 200 of evaluating said first section to determine if it is water break free. If not, steps 206 and 200 may be repeated until said first section has achieved an acceptable level of cleanliness. Impurities on the metal surface may interfere with the adherence of a silicate protective film and sealant layer, as provided in the following steps of this method, and so afford opportunities for moisture, salt, and air to reach the metal surface, causing corrosion. The initial steps of evaluating the surface for impurities and, if impurities are detected, cleaning the surface, therefore further reduces the likelihood of corrosion on a metal surface treated according to the present method. If the conclusion of step 200 is that the surface is acceptable as a water break free surface, then the process continues with step 210 of contacting a first amount of aqueous silicate solution with the first section of the metal surface to form a protective film which includes silicate compound. The embodiment of the present method includes also a step 220 of permitting the protective film to dry, a step 230 of applying a first amount of sealant solution to said first section of the metal surface to form a sealant layer, and a step 240 of permitting the sealant layer to dry. In a preferred embodiment of this method, the sealant solution is comprised of aqueous dichromate solution and the sealant layer is comprised of dichromate compound, although other sealant solutions comprised of dichromate compounds may be used.

Figure 4:
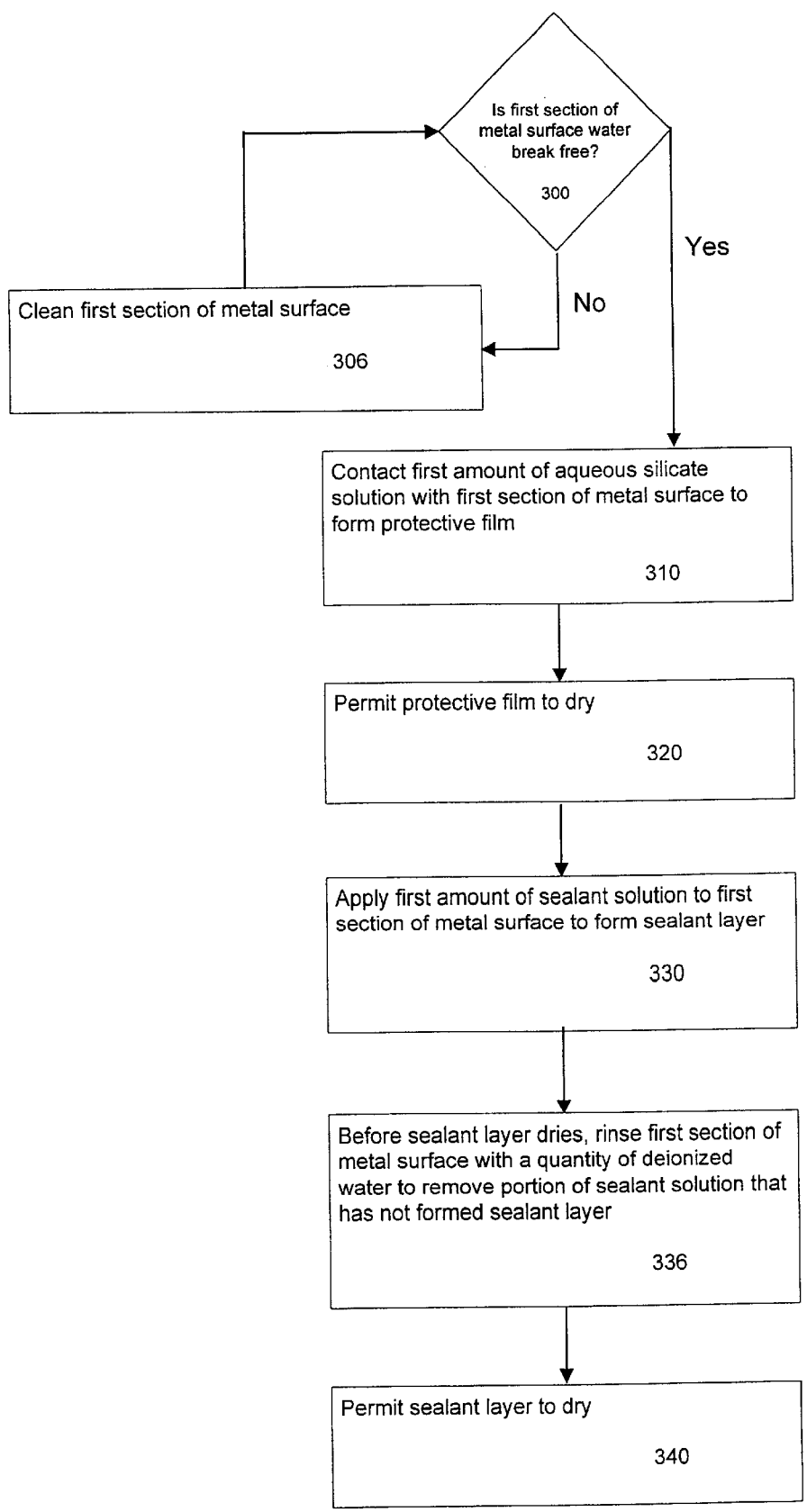
FIG. 4 is a flow chart of a further embodiment of the method of the present invention.

FIG. 4 describes another embodiment of the invention that combines the steps of the embodiments described in FIGS. 2 and 3. Referring to FIG. 4, the embodiment includes step 300 of evaluating a first section of a metal surface to determine whether it is a water break free surface, and, if not, step 306 of cleaning said first section, and then repeating step 300 of evaluating said first section to determine whether it is water break free. When the surface is determined to be water break free, the invention includes step 310 of contacting a first amount of an aqueous silicate solution with the first section of the metal surface, to form a protective film, comprised of silicate compound; step 320 of permitting the protective film to dry; step 330 of applying a first amount of sealant solution to the first section to form a sealant layer; before said sealant layer dries, step 336 of rinsing the first section of the metal surface with a quantity of deionized water to remove a portion of sealant solution that has not formed a sealant layer; and step 340 of permitting the sealant layer to dry.

In each of the embodiments described herein, the aqueous silicate solution is preferably a sodium silicate solution prepared by diluting a prime sodium silicate solution having the constituents displayed in Table I (see below) to a concentration in the range of about 25% to about 30% by volume of the prime sodium silicate solution in deionized water. While other forms and concentrations of silicate may be used, as well as other methods of preparation, the preferred concentration of sodium silicate and other constituents in deionized water to be applied to metal surfaces in the present invention is specified in Table II. Lesser concentrations of sodium silicate may be used, but produce weaker corrosion-inhibiting effects; higher concentrations also may produce weaker corrosion-inhibiting effects due to presence of more micro porosities. In each of the embodiments, the preferred sodium dichromate solution was prepared to a concentration of about 275 grams of sodium dichromate per gallon of deionized water. This produces a solution of about 7.3% sodium dichromate by weight in deionized water. While lesser concentrations of sodium dichromate may be used, the preferred corrosion-inhibiting effects were obtained with solutions of at least the concentration described. More concentrated solutions of sodium dichromate may also be used, and are contemplated as within the scope of the present solution, although they may not be as cost-effective in producing the desired corrosion-inhibiting effects. The deionized water used in each aspect of the method preferably met at least one of Types I, II, III and IV of ASTM D1193 or an equivalent specification. While ordinary tap water may be used in the invention, enhanced corrosion-inhibiting effects are generally obtained with deionized water, preferably deionized water meeting the standards described herein.

TABLE I

| Prime Sodium Silicate Solution (Concentrations by weight in deionized water) | |
|---|---|
| Sodium silicate | 35–40% |
| $Na_2O$ | 8.83–9.06% |
| $SiO_2$ | 29.0–29.34% |
| Sulfates | <200 ppm |
| Chlorides | <350 ppm |
| Aluminum | <550 ppm |
| Iron | <80 ppm |
| Titanium | <100 ppm |
| Other metallic constituents | <59 ppm |
| Ratio of $SiO_2$ to $Na_2O$ | 3.23–3.29 |

TABLE II

| AQUEOUS SODIUM SILICATE SOLUTION, % BY VOLUME OF THE PRIME SODIUM SILICATE SOLUTION TABLE I. | AQUEOUS SODIUM SILICATE SOLUTION, % BY WEIGHT OF THE PRIME SODIUM SILICATE SOLUTION TABLE I. | AQUEOUS SODIUM SILICATE SOLUTION, % BY WEIGHT OF SODIUM SILICATE (BASED ON 35 TO 40% BY WEIGHT OF SODIUM SILICATE IN PRIME SODIUM SILICATE SOLUTION TABLE I). |
|---|---|---|
| 25 | 31.7 | 11.1 to 12.7[1] |
| 30 | 37.4 | 13.1 to 15.0[1] |

[1]$SiO_2$ to $Na_2O$ Ratio 3.23 to 3.29

The preferred concentrations of sodium silicate and sodium dichromate solutions were applied according to the embodiment of FIG. 4 to metal surfaces comprised of the aluminum alloy 2014-T6, which is characterized by a high proportion of copper in comparison to other aluminum alloys. In this implementation, the silicate and dichromate solutions were applied by a conventional spraying method, a pressure container with a spray nozzle, to the metal surfaces, using perpendicular passes of each solution. Spray sodium silicate solution on a selected surface, one or two passes. After completion of spraying on the entire surface, repeat the same spraying on the same surface in perpendicular direction. Use the same spraying method for sodium dichromate solution. In the present method, there is no need for continued spraying of large quantities of solution over extended periods of time. The present method provides advantages of comparatively short spraying times, just like a paint (IMCP), and application of relatively small quantities of silicate and dichromate solution. The present method accordingly produces substantial advantages over chromate conversion coating methods of inhibiting corrosion. In this implementation, the preferred method of steps 320 and 340 involve simple exposure to the ambient atmosphere, followed by visual observation by the user of ambient visible dryness. Also, in this implementation, where drying occurs by exposure to the ambient atmosphere, the step 336 of rinsing with deionized water occurs approximately two minutes after completion of the step 330 of applying the dichromate solution. In this embodiment, following completion of the process, including step 340 of permitting the dichromate sealant layer to dry, the combined layers of silicate protective film and dichromate sealant layer were weighed and found to be about 0.8 grams/square foot of metal surface.

The 2014-T6 aluminum alloy metal surfaces, after treatment according to the implementation described above, and once protected by the silicate protective film and dichromate sealant layer, were then exposed to cryogenic temperatures in the range of −300° F. to −285° F. (such as may occur on exposure to liquid oxygen), and to elevated temperatures in the range of 140° F. to 145° F. (such as may occur when metal surfaces are exposed to direct sunlight on the launch pad). The metal surfaces were then exposed in a salt fog chamber for seven days according to the requirements of ASTM B117, and were examined for corrosion during this period. No evidence of corrosion was found through the seventh day of exposure in the salt fog chamber. Seven days of exposure in the salt fog chamber is equivalent to approximately one year of exposure at a launch pad on the seacoast.

The present invention may be applied to other aluminum alloy surfaces, such as other alloys of the 2000 series, or of the 6000 series and 7000 series. Because the 2014-T6 alloy is more susceptible to corrosion than other aluminum alloys, it is expected that the corrosion-inhibiting effects of the invention will likely be the same or better with other aluminum alloys. The invention also contemplates that the above-described method may be applied to other metal surfaces. The invention is effective with external metal surfaces, but may also be used with internal metal surfaces. Because silicate and dichromate are both compatible with liquid oxygen, the present invention presents substantial advantages in space vehicle applications.

The foregoing description of the invention has been presented for purposes of illustration and description. Furthermore, the description is not intended to limit the invention to the form disclosed herein. Consequently, variations and modifications consistent with the above teachings and with the skill or knowledge of the relevant art are within the scope of the present invention. The embodiments described hereinabove are further intended to explain the best modes known for practicing the invention and to enable other skilled in the art to utilize the invention in such, or, other embodiments and with various modifications required by the particular applications or uses of the present invention. It is intended that the appended claims should be construed to include alternative embodiments to the extent permitted by the prior art.

What is claimed is:

1. A process for inhibiting corrosion on a metal surface, comprising the steps of:

contacting a first amount of an aqueous silicate solution with at least a first section of a metal surface to form a protective film on said first section of the metal surface, said protective film comprising silicate;

permitting said protective film to dry;

applying a first amount of a sealant solution to at least said first section of the metal surface to form a sealant layer, wherein at least a first portion of said first amount of said sealant solution adheres to and seals said protective film, wherein said sealant solution comprises an aqueous dichromate solution and wherein said sealant layer comprises a dichromate compound; and permitting said sealant layer to dry.

2. The process of claim 1, further comprising the step of:

after said step of applying and prior to drying of said sealant layer, rinsing said first section of the metal surface with a first amount of deionized water to remove a second portion of said first amount of sealant solution which has not adhered to said protective film and formed said sealant layer.

3. The process of claim 1, further comprising the step, before said step of contacting, of cleaning said first section of the metal surface to remove at least a first impurity to provide a water break free surface.

4. The process of claim 1, further comprising the step of:

before said step of contacting, evaluating said first section of the metal surface to determine whether first said section is a water-break free surface.

5. The process of claim 4, wherein said first section is not a water break free surface, said process further comprising the step of cleaning said first section of the metal surface to remove at least a first impurity to provide said water break free surface.

6. The process of claim 1 wherein said aqueous silicate solution comprises by weight in deionized water: at least about 11.1% sodium silicate with a ratio of $SiO_2$ to $Na_2O$ of 3.23 to 3.29.

7. The process of claim 1, wherein said aqueous silicate solution comprises by weight in deionized water: less than or equal to about 15.0% sodium silicate with a ratio of $SiO_2$ to $Na_2O$ in the range of about 3.23 to about 3.29.

8. The process of claim 1, wherein said aqueous dichromate solution is comprised of a concentration of sodium dichromate by weight of at least about 7.3% sodium dichromate in deionized water.

9. The process of claim 1, wherein following said step of permitting said dichromate sealant layer to dry, said protective film and dichromate sealant layer together weigh at least 0.8 grams per square foot of metal surface.

10. The process of claim 1, wherein said first section of the metal surface comprises an aluminum alloy.

11. The process of claim 1, wherein said first section of the metal surface comprises an aluminum alloy selected from a group consisting of the 2000 series, 6000 series and 7000 series of aluminum alloys.

12. The process of claim 1, wherein said first section of the metal surface comprises a metal selected from a group consisting of carbon/alloy steel and magnesium alloy.

13. The process of claim 1, wherein said step of permitting said protective film to dry includes the step of exposing said protective film to the ambient atmosphere.

14. The process of claim 1, wherein said step of permitting said protective film to dry includes the step of actively drying said protective film.

15. The process of claim 1, wherein said steps of contacting and applying comprise at least one of spraying, rolling, immersing and brushing said silicate solution and said sealant solution, respectively, on said first section of the metal surface.

16. The process of claim 2, wherein said step of rinsing occurs after completion of a first time period following said step of applying.

17. The process of claim 16, wherein said first time period is about two minutes.

18. The process of claim 1, wherein said aqueous silicate solution comprises by weight in deionized water: about 11.1 to 15.0% sodium silicate with a ratio of $SiO_2$ to $Na_2O$ of about 3.23 to 3.29, sulfates of less than about 75 parts per million, chlorides of less than about 131 parts per million, aluminum of less than about 206 parts per million, iron of less than about 29 parts per million, and titanium of less than about 37 parts per million.

19. The process of claim 1, wherein said aqueous silicate solution comprises an inorganic aqueous alkali silicate corrosion-inhibiting solution, and wherein said sealant solution comprises an aqueous inorganic sealant solution.

20. A process for inhibiting corrosion on a metal surface, comprising the steps of:

contacting a first amount of an aqueous silicate solution with at least a first section of a metal surface to form a protective film on said first section of the metal surface, said protective film comprising silicate;

permitting said protective film to dry;

applying a first amount of a sealant solution to at least said first section of the metal surface to form a sealant layer, wherein at least a first portion of said first amount of said sealant solution adheres to and seals said protective film;

rinsing said first section of the metal surface with a first amount of deionized water to remove a second portion of said first amount of sealant solution which has not adhered to said protective film informed said sealant layer; and permitting said sealant layer to dry, wherein said rinsing step is executed after said contacting step and before said permitting said sealant layer to dry step.

21. The process of claim 20, wherein said step of rinsing occurs after completion of a first time period following said step of applying.

22. The process of claim 21, wherein said first time period is about two minutes.

* * * * *